US011168164B2

(12) United States Patent
Beveridge et al.

(10) Patent No.: US 11,168,164 B2
(45) Date of Patent: Nov. 9, 2021

(54) CROSSLINKABLE AND CROSSLINKED COMPOSITIONS

(71) Applicant: 3M INNOVATIVE PROPERTIES COMPANY, St. Paul, MN (US)

(72) Inventors: Nicole Morozowich Beveridge, Stillwater, MN (US); Ross E. Behling, Woodbury, MN (US); Anish Kurian, Woodbury, MN (US); Mark F. Ellis, St. Paul, MN (US); Karl E. Benson, St. Paul, MN (US); Michele A. Craton, Cottage Grove, MN (US); Daniel C. Munson, Maplewood, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 311 days.

(21) Appl. No.: 16/341,959

(22) PCT Filed: Aug. 22, 2017

(86) PCT No.: PCT/US2017/047893
§ 371 (c)(1),
(2) Date: Apr. 15, 2019

(87) PCT Pub. No.: WO2018/080623
PCT Pub. Date: May 3, 2018

(65) Prior Publication Data
US 2019/0241690 A1    Aug. 8, 2019

Related U.S. Application Data

(60) Provisional application No. 62/413,024, filed on Oct. 26, 2016.

(51) Int. Cl.
| | | |
|---|---|---|
| *C09J 7/38* | (2018.01) | |
| *C09J 133/08* | (2006.01) | |
| *C09J 133/10* | (2006.01) | |
| *C08F 2/48* | (2006.01) | |
| *C08F 220/18* | (2006.01) | |
| *C09J 133/14* | (2006.01) | |

(52) U.S. Cl.
CPC .............. *C08F 220/18* (2013.01); *C08F 2/48* (2013.01); *C09J 7/385* (2018.01); *C09J 133/08* (2013.01); *C09J 133/10* (2013.01); *C09J 133/14* (2013.01); *C08F 2810/20* (2013.01); *C09J 2301/416* (2020.08)

(58) Field of Classification Search
CPC ....................................................... C09J 7/385
See application file for complete search history.

(56) References Cited

U.S. PATENT DOCUMENTS

| | | |
|---|---|---|
| 5,637,646 A | 6/1997 | Ellis |
| 5,804,610 A | 9/1998 | Hamer |
| 5,986,011 A | 11/1999 | Ellis |
| 6,294,249 B1 | 9/2001 | Hamer |
| 6,586,491 B2 | 7/2003 | Husemann |
| 7,838,110 B2 | 11/2010 | Zhu |
| 2005/0129936 A1 | 6/2005 | Husemann |
| 2006/0036040 A1 | 2/2006 | Takeko |
| 2007/0055006 A1 | 3/2007 | Kim |
| 2011/0028583 A1 | 2/2011 | Smith |
| 2011/0178250 A1 | 7/2011 | Steelman |
| 2012/0115976 A1 | 5/2012 | Igarashi |
| 2012/0172477 A1 | 7/2012 | Huang |
| 2012/0214896 A1 | 8/2012 | Igarashi |
| 2012/0277341 A1 | 11/2012 | Smith |
| 2014/0367040 A1 * | 12/2014 | Traser .................. B32B 27/308 156/332 |

FOREIGN PATENT DOCUMENTS

| | | | |
|---|---|---|---|
| EP | 2733186 | 5/2014 | |
| WO | WO 2006-094177 | 9/2006 | |
| WO | WO 2006-119505 | 11/2006 | |
| WO | WO 2011-112508 | 9/2011 | |
| WO | WO 2011-119363 | 9/2011 | |
| WO | WO 2014-078115 | 5/2014 | |
| WO | WO 2014-078118 | 5/2014 | |
| WO | WO 2014-078123 | 5/2014 | |
| WO | WO-2014078123 A1 * | 5/2014 | ............ C09J 133/06 |
| WO | WO 2016-106003 | 6/2016 | |
| WO | WO 2016-109262 | 7/2016 | |

OTHER PUBLICATIONS

International Search Report for PCT International Application No. PCT/US2017/047893, dated Nov. 24, 2017, 4 pages.

* cited by examiner

*Primary Examiner* — Vu A Nguyen
(74) *Attorney, Agent, or Firm* — Jean A. Lown

(57) ABSTRACT

Crosslinkable compositions, crosslinked compositions, articles containing these compositions, and methods of making the articles are provided. The crosslinkable compositions, which include two (meth)acrylate polymers, are used to form the crosslinked compositions upon exposure to ultraviolet radiation. The crosslinkable and crosslinked compositions are free or substantially free of tackifiers. The crosslinked compositions can function as pressure-sensitive adhesives. The crosslinkable compositions are well suited for use with hot melt processing methods.

14 Claims, No Drawings

CROSSLINKABLE AND CROSSLINKED COMPOSITIONS

CROSS REFERENCE TO RELATED APPLICATIONS

This application is a national stage filing under 35 U.S.C. 371 of PCT/US2017/047893, filed Aug. 22, 2017, which claims the benefit of U.S. Provisional Application No. 62/413,024,filed Oct. 26, 2016, the disclosure of which is incorporated by reference in its/their entirety herein.

TECHNICAL FIELD

A crosslinkable composition, a crosslinked composition formed by exposure of the crosslinkable composition to ultraviolet radiation, articles containing these compositions, and methods of making the articles are described.

BACKGROUND

Pressure-sensitive adhesive tapes are virtually ubiquitous in the home and workplace. In one of its simplest configuration, a pressure-sensitive adhesive tape includes a backing layer and an adhesive layer attached to the backing layer. According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties such as the requisite peel strength and shear holding power.

One important class of pressure-sensitive adhesives include those with a (meth)acrylate polymer as the elastomeric material. The (meth)acrylate polymers can be used alone or can be combined with tackifiers to provide the desired adhesive properties. Tackifiers can be added, for example, to alter the rheology and compliance of the adhesive composition, to change the surface energy of the adhesive composition, and to alter the melt processing characteristics of the adhesive composition.

SUMMARY

Crosslinkable compositions, crosslinked compositions, articles containing these compositions, and methods of making the articles are provided. The crosslinkable compositions include two different (meth)acrylate polymers that each have a weight average molecular weight no greater than 500,000 Daltons. At least one of the (meth)acrylate polymers contains pendant aromatic ketone groups that upon exposure to ultraviolet radiation, result in the formation of crosslinks within the polymeric material. The crosslinkable composition is free or substantially free of tackifiers. The crosslinked compositions can function as pressure-sensitive adhesives.

In a first aspect, a crosslinkable composition is provided. The crosslinkable composition includes a first (meth)acrylate polymer and a second (meth)acrylate polymer, wherein each of the first (meth)acrylate polymer and the second (meth)acrylate polymer have a weight average molecular weight in a range of 50,000 to 500,000 Daltons. The first (meth)acrylate polymer is a reaction product of a first monomer composition comprising a) an alkyl (meth)acrylate and b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition. The second (meth)acrylate polymer is a reaction product of a second monomer composition comprising a) an alkyl (meth)acrylate and b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition. The crosslinkable composition is free or substantially free of tackifier.

In a second aspect, an article is provided. The article includes a substrate and a coating of a crosslinkable composition positioned adjacent to the substrate. The crosslinkable composition is the same as described above.

In a third aspect, a crosslinked composition is provided. The crosslinked composition contains a reaction product of a crosslinkable composition exposed to ultraviolet radiation. The crosslinkable composition is the same as described above.

In a fourth aspect, an article is provided. The article includes a substrate and a coating of a crosslinked composition positioned adjacent to the substrate. The crosslinked composition contains a reaction product of a crosslinkable composition exposed to ultraviolet radiation. The crosslinkable composition is the same as described above.

In a fifth aspect, a method of making an article is provided. The method includes providing a substrate, positioning a crosslinkable composition adjacent to the substrate, and then exposing the crosslinkable composition to ultraviolet light to form a crosslinked composition. The crosslinkable composition is the same as described above.

DETAILED DESCRIPTION

Crosslinkable compositions, crosslinked compositions, articles containing these compositions, and methods of making the articles are provided. The crosslinkable compositions, which include two different (meth)acrylate polymers, are used to form the crosslinked compositions upon exposure to ultraviolet radiation. The crosslinked compositions can function as pressure-sensitive adhesives. The crosslinkable compositions are particularly well suited for application to rough surfaces (e.g., foam surfaces) and/or for adhesion to low surface energy surfaces. Further, the crosslinked compositions can be cleanly removed, if desired, from a variety of surfaces.

The crosslinkable compositions contain at least two different (meth)acrylate polymers. The two different (meth)acrylate polymers are referred to as the first (meth)acrylate polymer and the second (meth)acrylate polymer. Both of these (meth)acrylate polymers have a relatively low weight average molecular weight that is typically in a range of 50,000 to 500,000 Daltons or in a range of 50,000 to 475,000 Daltons. At least the second (meth)acrylate polymer contains a pendant aromatic ketone group that can result in crosslinking when the crosslinkable composition is exposed to ultraviolet radiation.

The crosslinkable compositions are free or substantially free of a tackifier. Tackifiers can be difficult to incorporate into a crosslinked network due to their relatively low molecular weight. Additionally, tackifiers tend to absorb actinic radiation in the same wavelength range as the crosslinking monomer. This can result in difficulty forming a crosslinked network and can adversely affect clean removability because the tackifier is not incorporated into the crosslinked network.

As used herein, the term "(meth)acrylate" refers to a methacrylate and/or an acrylate. In many embodiments, the (meth)acrylate is an acrylate. Similarly, the term "(meth)acrylamide" refers to a (meth)acrylamide and/or an acrylamide and the term "(meth)acrylic" refers to a methacrylic and/or an acrylic material (e.g., methacrylic acid and/or acrylic acid).

As used herein, the term "polymeric material" and "polymer" are used interchangeably to refer to a homopolymer, polymer, terpolymer, and the like, or a mixture thereof.

The term "and/or" such as in the expression A and/or B means either A alone or B alone or both A and B.

The terms "in a range of" or "in the range of" are used interchangeably to refer to all values within the range plus the endpoints of the range.

The first (meth)acrylate polymer in the crosslinkable composition forms an elastomeric material upon crosslinking in the presence of the second (meth)acrylate polymer. The first (meth)acrylate polymer is a reaction product of a first monomer composition that includes at least one alkyl (meth)acrylate monomer. The alkyl group can be linear (e.g., with 1 to 32 carbon atoms or 1 to 20 carbon atoms), branched (e.g., with 3 to 32 carbon atoms or 3 to 20 carbon atoms), cyclic (e.g., with 3 to 32 carbon atoms or 3 to 20 carbon atoms), or a combination thereof.

Exemplary alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, isobornyl (meth)acrylate, n-decyl (meth)acrylate, isodecyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylate. Some exemplary branched alkyl (meth)acrylates are (meth)acrylic acid esters of Guerbet alcohols having 12 to 32 carbon atoms as described in PCT Patent Application Publication WO 2011/119363 (Clapper et al.).

The amount of alkyl (meth)acrylate is often at least 60 mole percent of the monomers in the first monomer composition. For example, the first monomer composition can contain at least 65 mole percent, at least 70 mole percent, at least 75 mole percent, at least 80 mole percent, at least 85 mole percent, at least 90 mole percent, or at least 95 mole percent alkyl (meth)acrylate based on total moles of monomer in the first monomer composition. The amount of the alkyl (meth)acrylate can be up to 100 mole percent, up to 99 mole percent, up to 98 mole percent, or up to 95 mole percent.

The first monomer composition often includes one or more optional polar monomers. As used herein, the term "polar monomer" refers to a monomer having a single ethylenically unsaturated group and a polar group. The polar group is often a hydroxyl group, an acidic group, a primary amido group, a secondary amido group, a tertiary amido group, an amino group, or an ether group (i.e., a group containing at least one alkylene-oxy-alkylene group of formula —R—O—R— where each R is an alkylene having 1 to 4 carbon atoms). The polar group can be in the form of a salt. For example, the acidic group can be in the form of an anion and can have a cationic counter ion. In many embodiments, the cationic counter ion is an alkaline metal ion (e.g., sodium, potassium, or lithium ion), an alkaline earth ion (e.g., calcium, magnesium, or strontium ion), an ammonium ion, or an ammonium ion substituted with one or more alkyl or aryl groups. The various amido or amino groups can be in the form of a cation and can have an anionic counter ion. In many embodiments, the anionic counter ion is a halide, acetate, formate, sulfate, phosphate, or the like.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth)acrylates (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with an acidic group can be, for example, a carboxylic acid monomer, a phosphonic acid monomer, a sulfonic acid monomer, a salt thereof, or a combination thereof.

Exemplary acidic monomers include, but are not limited to, (meth)acrylic acid, itaconic acid, fumaric acid, crotonic acid, citraconic acid, maleic acid, oleic acid, β-carboxyethyl acrylate, 2-(meth)acrylamidoethanesulfonic acid, 2-(meth)acrylamido-2-methylpropane sulfonic acid, vinylsulfonic acid, and the like. In many embodiments, the polar monomer is (meth)acrylic acid.

An exemplary polar monomer with a primary amido group is (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

Exemplary polar monomers with an ether group include, but are not limited to, alkoxylated alkyl (meth)acrylates such as ethoxyethoxyethyl (meth)acrylate, 2-methoxyethyl (meth)acrylate, and 2-ethoxyethyl (meth)acrylate; and poly (alkylene oxide) (meth)acrylates such as poly(ethylene oxide) (meth)acrylates and poly(propylene oxide) (meth) acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

In many embodiments, the first monomer composition includes a polar monomer having an acidic group or a basic group. Monomers with basic groups are often nitrogen-containing monomers such as those with a primary amido group, secondary amido group, or amino group.

The polar monomer is often included in the first monomer composition to enhance adhesion of the crosslinked composition (e.g., a coating of the crosslinked composition) to a substrate and to enhance the cohesive strength of the crosslinked composition. If present, the polar monomer can be included in an amount up to 40 mole percent based on total moles of monomer in the first monomer composition. In many embodiments, the polar monomer is present in an amount up to 35 mole percent, up to 30 mole percent, up to 25 mole percent, up to 20 mole percent, up to 15 mole percent, or up to 10 mole percent based on total moles of monomer in the first monomer composition. The first monomer composition often contains at least 1 mole percent, at least 2 mole percent, at least 3 mole percent, at least 4 mole percent, or at least 5 mole percent polar monomer. The polar monomer can be present, for example, in an amount in the range of 0 to 40 mole percent, in the range of 1 to 40 mole percent, in the range of 1 to 35 mole percent, in the range of 1 to 30 mole percent, in the range of 1 to 25 mole percent, in the range of 0 to 20 mole percent, in the range of 1 to 20 mole percent, in the range of 1 to 15 mole percent, in the range of 0 to 10 mole percent, in the range of 1 to 10 mole percent, or in the range of 2 to 10 mole percent based on total moles of monomer in the first monomer composition.

Any other monomers compatible with (e.g., miscible with) the monomers in the first monomer composition can be included. Examples of other monomers include various aryl (meth)acrylate (e.g., phenyl (meth)acrylate), vinyl ethers, vinyl esters (e.g., vinyl acetate), olefinic monomers (e.g., ethylene propylene, or butylene), styrene, styrene derivatives (e.g., alpha-methyl styrene), and the like. Still other example monomers are aryl substituted alkyl (meth) acrylates or alkoxy substituted alkyl (meth)acrylates such as 2-biphenylhexyl (meth)acrylate, benzyl (meth)acrylate, and 2-phenoxy ethyl (meth)acrylate. In many embodiments, the (meth)acrylate is an acrylate. The first monomer composition typically does not include a monomer with multiple (meth)acryloyl groups or multiple vinyl groups.

The first monomer composition can optionally include a UV crosslinking monomer having an aromatic ketone group that is crosslinkable when exposed to ultraviolet radiation. When exposed to UV radiation, the aromatic ketone groups can abstract a hydrogen atom from another polymeric chain or another portion of the same polymeric chain. This abstraction results in the formation of crosslinks between polymeric chains or within the same polymeric chain. In many embodiments, the aromatic ketone group is a derivative of benzophenone (i.e., a benzophenone-containing group). That is, the UV crosslinking monomers are often benzophenone-based monomers. Examples of UV crosslinking monomers include, but are not limited to, 4-(meth) acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, 4-acryloyloxyethoxy-4'-bromobenzophenone, and the like.

The UV crosslinking monomer can be present in the first monomer composition in an amount up to 0.3 mole percent (i.e., 0 to 0.3 mole percent) based on total moles of monomer. The amount is often limited when the polymerization reaction is initiated by exposure to UV radiation. That is, the UV crosslinkable monomer can cause undesired gelation during the polymerization process. In some examples, the UV crosslinking monomer can be up to 0.2 mole percent, up to 0.1 mole percent, or up to 0.05 mole percent based on total moles of monomer in the first monomer composition.

Some first monomer compositions include 60 to 100 mole percent alkyl (meth)acrylate, 0 to 40 mole percent polar monomer, and 0 to 0.3 mole percent UV crosslinking monomer. In some examples, the first monomer compositions include 60 to 99 mole percent alkyl (meth)acrylate, 1 to 40 mole percent polar monomer, and 0 to 0.3 mole percent UV crosslinking monomer. In other examples, the first monomer compositions include 75 to 99 mole percent alkyl (meth)acrylate, 1 to 25 mole percent polar monomer, and 0 to 0.3 mole percent UV crosslinking monomer. In still other examples, the first monomer compositions include 85 to 99 mole percent alkyl (meth)acrylate, 1 to 15 mole percent polar monomer, and 0 to 0.3 mole percent UV crosslinking monomer. In yet other examples, the first monomer compositions include 90 to 99 mole percent alkyl (meth)acrylate, 1 to 10 mole percent polar monomer, and 0 to 0.3 mole percent UV crosslinking monomer. The amounts are based on total moles of monomer in the first monomer composition.

In addition to the first monomer composition, the first reaction mixture used to prepare the first (meth)acrylate polymer typically includes a free radical initiator to commence polymerization of the monomers. The free radical initiator can be a photoinitiator or a thermal initiator. Suitable thermal initiators include various azo compound such as those commercially available under the trade designation VAZO from E. I. DuPont de Nemours Co. (Wilmington, Del., USA) including VAZO 67, which is 2,2'-azobis(2-methylbutane nitrile), VAZO 64, which is 2,2'-azobis(isobutyronitrile), VAZO 52, which is 2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa.) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)

oxime. Other suitable photoinitiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA).

The first reaction mixture may optionally further contain a chain transfer agent to control the molecular weight of the resultant (meth)acrylate polymer (e.g., (meth)acrylate polymer). Examples of useful chain transfer agents include, but are not limited to, carbon tetrabromide, alcohols (e.g., isopropanol), mercaptans or thiols (e.g., lauryl mercaptan, butyl mercaptan, ethanethiol, isooctylthioglycolate, 2-ethylhexyl thioglycolate, 2-ethylhexyl mercaptopropionate, ethyleneglycol bisthioglycolate, and tertiary dodecyl mercaptan), and mixtures thereof. In some embodiments where a chain transfer agent is used that is not an alcohol, the polymerizable mixture often includes up to 2 weight percent, up to 1 weight percent, up to 0.5 weight percent, up to 0.2 weight percent, or up to 0.1 weight percent transfer agent based on a total weight of monomers. If the chain transfer agent is an alcohol, however, the amount of chain transfer agent in the polymerizable mixture can be up to 5 weight percent, up to 10 weight percent, or up to 20 weight percent. If a chain transfer agent is present, the first reaction mixture can contain at least 0.005 weight percent, at least 0.01 weight percent, at least 0.02 weight percent, or at least 0.05 weight percent of the chain transfer agent based on the total weight of monomers.

The polymerization of the first reaction mixture can occur in the presence or absence of an organic solvent. If an organic solvent is included in the polymerizable mixture, the amount is often selected to provide the desired viscosity. Any desired amount of organic solvent can be used. For example, the amount can be up to 50 weight percent or more, up to 40 weight percent, up to 30 weight percent, up to 20 weight percent, or up to 10 weight percent of the first reaction mixture. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

In some embodiments, the polymerization occurs with little or no organic solvent present. That is the first reaction mixture is free of organic solvent or contains a minimum amount of organic solvent. If used, the organic solvent is often present in an amount less than 10 weight percent, less than 5 weight percent, less than 4 weight percent, less than 3 weight percent, less than 2 weight percent, or less than 1 weight percent based on the total weight of the first reaction mixture. If used, any organic solvent often is removed at the completion of the polymerization reaction but can be present in the blended mixture of the first (meth)acrylate polymer and the second (meth)acrylate polymer.

The first reaction mixture can be polymerized using any suitable method. The polymerization can occur in a single step or in multiple steps. That is, all or a portion of the monomers and/or thermal initiator may be charged into a suitable reaction vessel and polymerized. For example, a first reaction mixture containing an organic solvent and a thermal initiator can be mixed and heated at an elevated temperature such as in a range of 50° C. to 100° C. for several hours.

In some embodiments, the first (meth)acrylate polymer is prepared using an adiabatic process as described, for example, in U.S. Pat. No. 5,986,011 (Ellis et al.) and U.S. Pat. No. 5,637,646 (Ellis). In this polymerization method, the reaction components, including thermal initiator or initiators, are sealed in a reaction vessel. The contents are mixed and purged of oxygen and, if not already at induction temperature, then warmed to the induction temperature. The induction temperature, which is usually in the range of 40° C. to 75° C., depends on various factors such as the monomers, the initiator, and amount of the initiator used. The polymerization is performed under essentially adiabatic conditions with a peak reaction temperature in the range of 100° C. to 200° C. Multiple reaction steps with optional cooling in between steps can be employed to increase polymerization conversion on each successive step and to control the molecular weight. Optionally, various reaction components can be added in multiple steps to control the properties (e.g., molecular weight, molecular weight distribution, and polymer composition) of the resulting polymeric material.

In some polymerization methods, it may be desirable to minimize the use of organic solvents that will need to be removed later. One suitable method is to form the first (meth)acrylate polymer within a polymeric pouch that has been purged to remove oxygen. This method, which is further described in U.S. Pat. No. 5,804,610 (Hamer et al.) and U.S. Pat. No. 6,294,249 (Hamer et al.), is particularly advantageous when the first (meth)acrylate polymer is subsequently combined with the other components of the crosslinkable composition using hot melt processing methods.

In this polymerization method, the various components of the first reaction mixture can be sealed in a packaging material (e.g., polymeric pouch) that does not dissolve in the presence of the first reaction mixture and that is capable of transmitting ultraviolet radiation. The packaging material is usually selected to have a melting point at or below the processing temperature of the first (meth)acrylate polymer, which is the temperature at which this material will flow. The packaging material often has a melting point no greater than 200° C., no greater than 175° C., or no greater than 150° C. The packaging material is often prepared from a flexible thermoplastic polymeric film of ethylene-vinyl acetate, ethylene-acrylic acid, polypropylene, polyethylene, polybutadiene, or ionomeric materials. The polymeric films often have a thickness of at least 0.01 millimeters, at least 0.02 millimeters, or at least 0.03 millimeters. The thickness is often up to 0.30 millimeters, up to 0.25 millimeters, up to 0.20 millimeters, up to 0.15 millimeters, or up to 0.10 millimeters. Thinner films are often desired to minimize the amount of the packaging material that is added into the crosslinkable composition. The amount of the packaging material is typically at least 0.5 weight percent of the total weight of the packaging material and the first reaction mixture. For example, this amount is often at least 1 weight percent, at least 2 weight percent, or even at least 3 weight percent. The amount can be up to 20 weight percent, up to 15 weight percent, up to 10 weight percent, or up to 5 weight percent based on the total weight of the packaging material and the first reaction mixture. In some embodiments, the amount is in a range of 1 to 20 weight percent, 1 to 10 weight percent, or 2 to 10 weight percent based on the total weight of the packaging material and the first reaction mixture.

The packaging material is often in the form of a polymeric pouch prepared from two lengths of thermoplastic film that are heat sealed together across the bottom and each lateral edge. The first reaction mixture is placed within the polymeric pouch and the polymeric pouch is then heat sealed across the top to completely surround the first reaction mixture. Prior to sealing the top of the polymeric pouch, it is typically desirable to remove as much air as possible. A small amount of air can be tolerated if the amount is not sufficient to substantially interfere with the polymerization reaction.

The polymerization of the first reaction mixture occurs upon exposure to UV radiation. Suitable UV sources often have at least 60 percent, at least 65 percent, at least 70 percent, or at least 75 percent of the emission spectra within the range of 280 to 400 nanometers and have an intensity within the range of 0.1 to 25 mW/cm$^2$. The temperature of the reaction mixture is often controlled by immersing the sealed polymeric pouch in a water bath or heat transfer fluid controlled at a temperature in a range of 5° C. to 50° C., in a range of 5° C. to 40° C., in a range of 5° C. to 30° C., or in a range of 5° C. to 20° C.

Regardless of the particular polymerization method selected, the resulting product of the polymerization reaction is a random polymer. This polymeric material often has a weight average molecular weight equal to at least 50,000 Daltons, at least 75,000 Daltons, at least 100,000 Daltons, at least 125,000 Daltons, at least 150,000 Daltons, or at least 200,000 Daltons. The weight average molecular weight can be up to 500,000 Daltons, up to 475,000 Daltons, up to 450,000 Daltons, up to 400,000 Daltons, up to 375,000 Daltons, or up to 350,000 Daltons. The weight average molecular weight can be varied, for example, by altering the amount of chain transfer agent included in the first reaction mixture.

The monomers included in the first monomer composition are selected to provide a first (meth)acrylate polymer having a glass transition temperature no greater than 20° C., no greater than 10° C., no greater than 0° C., no greater than −10° C., no greater than −20° C., no greater than −30° C., no greater than −40° C., or no greater than −50° C. The glass transition temperature can be measured using Differential Scanning calorimetry or Dynamic Mechanical Analysis. The first (meth)acrylate polymer is elastomeric and typically satisfies the Dalquist criteria for being a pressure-sensitive adhesive.

The amount of the first (meth)acrylate polymer in the crosslinkable composition is often in a range of 80 to 98 weight percent based on a total weight of (meth)acrylate polymers (e.g., the sum of the amount of the first (meth)acrylate polymer plus the amount of the second (meth)acrylate polymer). For example, the crosslinkable composition can include at least 80 weight percent, at least 85 percent, at least 90 weight percent, or at least 95 weight percent of the first (meth)acrylate polymer. The amount of the first (meth)acrylate polymer can be up to 98 weight percent, up to 97 weight percent, up to 96 weight percent, up to 95 weight percent, up to 94 weight percent, up to 93 weight percent, up to 92 weight percent, up to 91 weight percent, or up to 90 weight percent based on the total weight of (meth)acrylate polymers in the crosslinkable composition.

In addition to the first (meth)acrylate polymer, the crosslinkable composition further contains a second (meth)acrylate polymer that is of a different composition than the first (meth)acrylate polymer. In particular, the second (meth)acrylate polymer is a reaction product of a second monomer composition that includes (1) an alkyl (meth)acrylate, substituted alkyl (meth)acrylate, or a mixture thereof plus (2) a UV crosslinking monomer having an aromatic ketone group that is crosslinkable with ultraviolet radiation. The UV crosslinking monomer is present in an amount equal to at least 1 mole percent based on total moles of monomer in the second monomer composition.

The alkyl (meth)acrylates that are suitable for use in the second monomer composition are the same as those described above for use in the first monomer composition. The second monomer composition can include up to 99 mole percent alkyl (meth)acrylate based on total moles of monomer in the second monomer composition. For example, the second monomer composition can contain up to 98 mole percent, up to 95 mole percent, up to 90 mole percent, up to 85 mole percent, or up to 80 mole percent alkyl (meth)acrylate. The second monomer composition often contains at least 60 mole percent, at least 65 mole percent, at least 70 mole percent, at least 75 mole percent, or at least 80 mole percent alkyl (meth)acrylate.

The UV crosslinking monomer in the second monomer composition is the same as that described above as an optional monomer in the first monomer composition. Even if the UV crosslinking monomer is included in the first (meth)acrylate polymer, it is present at a higher level in the second (meth)acrylate monomer. More specifically, the UV crosslinking monomer is present in amount equal to at least 1 mole percent based on total moles of monomer in the second monomer composition. For example, the UV crosslinking monomer can be present in an amount equal to at least 2 mole percent, at least 3 mole percent, at least 4 mole percent, or at least 5 mole percent based on total moles of monomer in the second monomer composition. The amount of the UV crosslinking monomer can be up to 10 mole percent or even higher, up to 8 mole percent, or up to 6 mole percent based on total moles of monomer in the second monomer composition. In some embodiments, the amount of the UV crosslinking monomer is in a range of 1 to 10 mole percent, in a range of 2 to 10 mole percent, in a range of 3 to 10 mole percent, in a range of 4 to 10 mole percent, or in a range of 5 to 10 mole percent based on total moles of monomer in the second monomer composition.

The UV crosslinking monomer includes an aromatic crosslinkable group that functions as a photocrosslinker when exposed to UV radiation. The aromatic ketone groups are often benzophenone derivatives and can abstract a hydrogen atom from another polymeric chain or another portion of the same polymeric chain. When the second (meth)acrylate polymer is exposed to UV radiation in the presence of the first (meth)acrylate polymer, this abstraction results in the crosslinking of the first (meth)acrylate compound and the formation of an elastomeric material. Examples of UV crosslinking monomers are benzophenone-containing monomers such as 4-(meth)acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, 4-acryloyloxyethoxy-4'-bromobenzophenone, and the like.

In addition to the alkyl (meth)acrylate and the UV crosslinking monomer, the second monomer composition can include optional monomers such as those described above for the first monomer composition. For example, the second monomer composition can include a polar monomer. Any polar monomer described for use in the first monomer composition can be used in the second monomer composition. If present, the amount of the polar monomer can be up to 40 mole percent based on total moles of monomer in the second monomer composition. In many embodiments, the polar monomer is present in an amount up to 39 mole percent, up to 35 mole percent, up to 30 mole percent, up to 25 mole percent, up to 20 mole percent, up to 15 mole percent, or up to 10 mole percent based on the total moles of monomer in the second monomer composition. The second monomer composition often contains at least 1 mole percent, at least 2 mole percent, at least 3 mole percent, at least 4 mole percent, or at least 5 mole percent polar monomer. The polar monomer can be present, for example, in an amount in the range of 0 to 40 mole percent, in the range of 0 to 39 mole percent, in the range of 0 to 35 mole percent, in the range of 0 to 30 mole percent, in the range of 0 to 25 mole percent, in the range of 1 to 25 mole percent, in the range of 1 to 20 mole percent, in the range of 1 to 15 mole percent, in the range of 1 to 10 mole percent, or in the range of 2 to 10 mole percent based on total moles of monomer in the second monomer composition.

In many embodiments, the second monomer composition includes a polar monomer having an acidic group or a basic group. Monomers with basic groups are often nitrogen-containing monomers such as those with a primary amido group, secondary amido group, tertiary amido, or amino group.

In some embodiments, it can be advantageous to use complementary polar monomers in the first (meth)acrylate polymer and the second (meth)acrylate polymer. For example, a monomer with an acidic group can be included in the first monomer composition while a monomer with a basic group can be included in the second monomer composition. Alternatively, a monomer with a basic group can be included in the first monomer composition while a monomer with an acidic group can be included in the second monomer composition. In some embodiments, the polar monomer with an acidic group is a (meth)acrylic acid monomer and the polar monomer with a basic group has an amido or amino group. The presence of these complementary polar monomers can increase the interactions between the two (meth)acrylate polymers and facilitate effective crosslinking of the first (meth)acrylate polymer by the second (meth)acrylate polymer. Further, the presence of these complementary polar monomers can increase the cohesive strength of the crosslinked composition due to the attractive interaction (acid-base or hydrogen bonding interactions) between the two (meth)acrylate polymers.

Any other monomers compatible with (e.g., miscible with) the monomers in the second monomer composition can be included. Examples of other monomers include various aryl (meth)acrylate (e.g., phenyl (meth)acrylate), vinyl ethers, vinyl esters (e.g., vinyl acetate), olefinic monomers (e.g., ethylene propylene, or butylene), styrene, styrene derivatives (e.g., alpha-methyl styrene), and the like. The second monomer composition typically does not include a monomer with multiple (meth)acryloyl groups or multiple vinyl groups. Still other example monomers are aryl substituted alkyl (meth)acrylates or alkoxy substituted alkyl (meth)acrylates such as 2-biphenylhexyl (meth)acrylate, benzyl (meth)acrylate, and 2-phenoxy ethyl (meth)acrylate. In many embodiments, the (meth)acrylate is an acrylate. The first monomer composition typically does not include a monomer with multiple (meth)acryloyl groups or multiple vinyl groups.

Some exemplary second monomer compositions contain up to 99 mole percent alkyl (meth)acrylate and at least 1 mole percent UV crosslinking monomer based on total moles of monomer in the second monomer composition. For example, the second monomer compositions can contain up to 99 mole percent alkyl (meth)acrylate and 1 to 10 mole percent UV crosslinking monomer. In more specific examples, the second monomer composition contains 60 to 99 mole percent alkyl (meth)acrylate, 1 to 10 mole percent UV crosslinking monomer, and 0 to 39 mole percent polar monomer or contains 65 to 99 mole percent alkyl (meth)acrylate, 1 to 10 mole percent UV crosslinking monomer, and 0 to 34 mole percent polar monomer.

Other exemplary second monomer compositions contain up to 98 mole percent alkyl (meth)acrylate, at least 1 mole percent polar monomer, and at least 1 mole percent crosslinking monomer based on total moles of monomer in the second monomer composition. In more specific examples, the second monomer composition contains 60 to 98 mole percent alkyl (meth)acrylate, 1 to 39 mole percent polar monomer, and 1 to 10 weight percent crosslinking monomer or contains 65 to 98 mole percent alkyl (meth)acrylate, 1 to 34 mole percent polar monomer, and 1 to 10 mole percent crosslinking monomer. In even more specific examples, the second monomer composition contains 75 to 98 mole percent alkyl (meth)acrylate, 1 to 24 mole percent polar monomer, and 1 to 10 mole percent crosslinking monomer. Even more specific examples include 80 to 97 mole percent alkyl (meth)acrylate, 1 to 18 mole percent polar monomer, and 2 to 10 mole percent crosslinking monomer.

To polymerize the second (meth)acrylate polymer from the second monomer composition, a second reaction mixture is prepared. The second reaction mixture typically includes the second monomer composition plus a free radical initiator. The free radical initiator is typically selected to be a thermal initiator rather than a photoinitiator to prevent the premature crosslinking of the second (meth)acrylate polymer in the absence of the first (meth)acrylate polymer. That is, a thermal initiator is used to form the second (meth)acrylate polymer having unreacted crosslinkable groups. The unreacted crosslinkable groups can then be subsequently reacted when exposed to UV radiation in the presence of the first (meth)acrylate polymer. Any suitable thermal initiator or combinations of thermal initiators can be used in the second reaction mixture such as those described above for use in the first reaction mixture. The thermal initiator is often an azo compound, peroxide compound, or mixture of one or more of these compounds.

Other components can be added to the second reaction mixture used to form the second (meth)acrylate polymer. In some embodiments, chain transfer agents such as those described above for use in the first reaction mixture can be added. Suitable amounts are the same as with the first reaction mixture.

The second reaction mixture can be polymerized using any suitable method such as those described above for polymerization of the first reaction mixture. The polymerization of the second reaction mixture can occur in the presence or absence of an organic solvent. If an organic solvent is included in the polymerizable mixture, the amount is often selected to provide the desired viscosity. Any desired amount of organic solvent can be used. For example, the amount can be up to 50 weight percent or more, up to 40 weight percent, up to 30 weight percent, up to 20 weight percent, or up to 10 weight percent of the first reaction mixture. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

In many embodiments, no organic solvent (i.e., the second reaction mixture is free of organic solvent) or only a minimum amount of the organic solvent is added. The amount of organic solvent is typically no greater than 10 weight percent, no greater than 8 weight percent, no greater than 5 weight percent, no greater than 3 weight percent, or no greater than 1 weight percent of the second reaction mixture. Any organic solvent used in the second reaction mixture is typically removed at the completion of the polymerization reaction but can be present in the blended mixture of the first (meth)acrylate polymer and the second (meth)acrylate polymer. Suitable organic solvents include those described above for use in the first reaction mixture.

The second (meth)acrylate polymer, which is a random polymer, typically has a weight average molecular weight equal to at least 50,000 Daltons, at least 75,000 Daltons, at least 100,000 Daltons, at least 125,000 Daltons, at least 150,000 Daltons, or at least 200,000 Daltons. The weight average molecular weight can be up to 500,000 Daltons, up to 475,000 Daltons, up to 450,000 Daltons, up to 425,000 Daltons, up to 400,000 Daltons, up to 375,000 Daltons, or up to 350,000 Daltons. The weight average molecular weight can be varied, for example, by altering the amount of chain transfer agent included in the first reaction mixture.

The second (meth)acrylate polymer typically has a glass transition temperature no greater than 20° C., no greater than 10° C., no greater than 0° C., no greater than −10° C., no greater than −20° C., no greater than −30° C., no greater than −40° C., or no greater than −50° C. The glass transition temperature can be measured using Differential Scanning calorimetry. The second (meth)acrylate polymer is elastomeric and typically satisfies the Dalquist criteria for being a pressure-sensitive adhesive.

The amount of the second (meth)acrylate polymer in the crosslinkable composition is often in a range of 2 to 20 weight percent based on a total weight of (meth)acrylate polymer (e.g., the weight of the first (meth)acrylate polymer plus the weight of the second (meth)acrylate polymer). For example, the crosslinkable composition can include at least 2 weight percent, at least 4 weight percent, at least 6 weight percent, at least 8 weight percent, or at least 10 weight percent of the second (meth)acrylate polymer. The amount of the second (meth)acrylate polymer can be up to 20 weight percent, up to 18 weight percent, up to 16 weight percent, up to 14 weight percent, or up to 12 weight percent based on the total weight of (meth)acrylate polymers in the crosslinkable composition.

A total weight of the (meth)acrylate polymers in kilograms divided by a total moles of UV crosslinker in the (meth)acrylate polymers is no greater than 150 kilograms per mole. Stated differently, the sum of the weights of the first (meth)acrylate polymer plus the second (meth)acrylate polymer divided by the sum of the moles of UV crosslinking monomer used to form the first (meth)acrylate polymer plus the second (meth)acrylate polymer is no greater than 150 kilograms per mole. This is the inverse of the crosslink density of the (meth)acrylate polymer. The lower this number, the greater is the amount of crosslinking. Higher crosslinking tends to result in enhanced cohesive strength. This value is often no greater than 140 kilograms per mole, no greater than 130 kilograms per mole, no greater than 120 kilograms per mole, no greater than 110 kilograms per mole, no greater than 100 kilograms per mole, no greater than 90 kilograms per mole, or no greater than 80 kilograms per mole.

The crosslinkable composition and/or crosslinked composition is free or substantially free of a tackifier. In reference to the tackifier, "substantially free" means that the crosslinkable composition, the crosslinked composition, or both contain no greater than 1 weight percent, no greater than 0.75 weight percent, no greater than 0.5 weight percent, no greater than 0.25 weight percent, or no greater than 0.1 weight percent tackifier based on the total weight of the composition. In most embodiments, the crosslinkable composition and/or crosslinked composition is free of a tackifier.

Various optional components can be added to the crosslinkable composition such as, for example, heat stabilizers, antioxidants, antistatic agents, plasticizers, thickeners, fillers, pigments, dyes, colorants, thixotropic agents, processing aides, nanoparticles, fibers, and combinations thereof. Such additives, if present, usually contribute in total less than 10 weight percent, less than 5 weight percent, less than 3 weight percent, or less than 1 weight percent to the solids of the crosslinkable composition.

The first (meth)acrylate polymer and the second (meth)acrylate polymer are blended together to form the crosslinkable composition. Any suitable method of blending these components together can be used. The blending method can be done in the presence or absence of an organic solvent. If done in the presence of an organic solvent, any desired amount of organic solvent can be used. Because any organic solvent needs to be removed, it is often desirable to minimize or eliminate the use of organic solvents. If organic solvents are present, the solvents are often removed after coating the crosslinkable composition on a substrate. The removal can occur before crosslinking, after crosslinking, or simultaneously with crosslinking.

In many embodiments, it can be advantageous to form a crosslinkable composition free or substantially free of an organic solvent. As used in reference to the organic solvent, the term "substantially free" means that the total solids of the crosslinkable composition is greater than 90 weight percent, greater than 95 weight percent, greater than 97 weight percent, greater than 98 weight percent, or greater than 99 weight percent based on a total weight of the crosslinkable composition.

In many embodiments, the blending methods include mixing the various components in a molten state. Such blending methods can be referred to as hot melt mixing methods or hot melt blending methods. Both batch and continuous mixing equipment can be used. Examples of batch methods for blending components of the crosslinkable composition include those using a BRABENDER (e.g., a BRABENDER PREP CENTER that is commercially available from C. W. Brabender Instruments, Inc. (South Hackensack, N.J., USA)) or BANBURY internal mixing and roll milling equipment, which is available from Farrel Co. (Ansonia, Conn., USA). Examples of continuous mixing methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements.

A single piece or multiple pieces of hot melt mixing equipment may be used to prepare the crosslinkable compositions. In some embodiments, it may be desirable to use more than one piece of hot melt mixing equipment. The output of hot melt processing equipment (e.g., first extruder, hot melt reactor, drum unloader) can be fed into a second extruder such as a twin screw extruder for hot melt mixing the first (meth)acrylate polymer with the second (meth) acrylate polymer, tackifier, or both.

The output of the hot melt mixing process is a blended crosslinkable composition. This blended crosslinkable composition can be applied as a coating to a substrate. If a batch apparatus is used, the hot melt blended crosslinkable composition can be removed from the apparatus and placed in a hot melt coater or extruder for coating onto a substrate. If an extruder is used, the hot melt blended crosslinkable composition can be directly extruded onto a substrate to form a coating.

The extruded coating is typically deposited on a substrate. Thus, in another aspect, an article is provided. The article includes a substrate and a coating of the crosslinkable composition positioned adjacent to the substrate. The crosslinkable composition is the same as described above and includes the first (meth)acrylate polymer and the second (meth)acrylate polymer. As used herein, the term "adjacent" refers to a first layer positioned near the second layer. The first and second layers can be in contact or can be separated from each other by another layer. For example, a substrate can be positioned adjacent to the crosslinkable composition if the substrate contacts the crosslinkable composition or is separated from the crosslinkable composition by another layer such as a primer layer or surface modification layer that increases the adhesion of the crosslinkable composition to the substrate. The crosslinkable composition is typically applied as a coating to a major surface of the substrate and the article is a substrate coated with the crosslinkable composition.

The expression "coating of the crosslinkable composition" is used interchangeably with the expression "crosslinkable composition coating". Likewise, the expression "coating of the crosslinked composition" is used interchangeably with the expression "crosslinked composition coating".

Any suitable substrate can be used in the article. For example, the substrate can be flexible or inflexible and can be formed from a polymeric material, glass or ceramic material, metal, or combination thereof. Some substrates are polymeric films such as those prepared from polyolefins (e.g., polyethylene, polypropylene, or polymers thereof), polyurethanes, polyvinyl acetates, polyvinyl chlorides, polyesters (polyethylene terephthalate or polyethylene naphthalate), polycarbonates, polymethyl(meth)acrylates (e.g., PMMA), ethylene-vinyl acetate polymers, polytetrafluoroethylene, and cellulosic materials (e.g., cellulose acetate, cellulose triacetate, and ethyl cellulose). Other substrates are metal foils, nonwoven materials (e.g., paper, cloth, nonwoven scrims), woven materials, foams (e.g., polyacrylic, polyethylene, polyurethane, neoprene), and the like. Some example paper substrates include, but are not limited to, crepe paper made from rice pulp, thickener saturated crepe paper, flatback paper made from pine or *eucalyptus* pulp, and tissues. Some example woven and non-woven substrates are cellulose-based or polypropylene-based. For some substrates, it may be desirable to treat the surface to improve adhesion to the crosslinked composition, crosslinkable composition, or both. Such treatments include, for example, application of primer layers, surface modification layer (e.g., corona treatment or surface abrasion), or both.

In some embodiments, the substrate is a release liner. Release liners typically have low affinity for the crosslinkable composition or crosslinked composition. Exemplary release liners can be prepared from paper (e.g., Kraft paper) or other types of polymeric material. Some release liners are coated with an outer layer of a release agent such as a silicone-containing material or a fluorocarbon-containing material.

The crosslinkable composition coating can have any desired thickness that can be effectively crosslinked when exposed to ultraviolet radiation. In many embodiments, the crosslinkable composition coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the crosslinkable composition coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

In other aspects, a crosslinked composition and an article containing the crosslinked composition are provided. The crosslinked composition is the reaction product of a crosslinkable composition exposed to ultraviolet radiation. The article includes a substrate and a crosslinked composition coating positioned adjacent to the substrate. The substrate and the crosslinkable composition used to form the crosslinked composition are the same as described above. Suitable ultraviolet radiation sources are the same as described above.

The crosslinked composition is typically a pressure-sensitive adhesive. Thus, articles with a coating of the crosslinked composition have a pressure-sensitive adhesive layer and can be used for many applications typical of such articles. The substrate adjacent to the pressure-sensitive layer can be selected depending on the particular application. For example, the substrate can be a sheeting material and the resulting article can provide decorative graphics or can be a reflective product. In other examples, the substrate can be label stock (the resulting article is a label with an adhesive layer) or tape backing (the resulting article is an adhesive tape). In yet other examples, the substrate can be a release liner and the resulting article can be a transfer tape. The transfer tape can be used to transfer the pressure-sensitive adhesive layer to another substrate or surface. Other substrates and surface include, for example, a panel (e.g., a metal panel such as an automotive panel) or a glass window.

Some articles are adhesive tapes. The adhesive tapes can be single-sided adhesive tapes with the crosslinkable composition attached to a single side of the tape backing or can be double-sided adhesive tape with a pressure-sensitive adhesive layer on both major surfaces of the tape backing. At least one of the two pressure-sensitive adhesive layers is the crosslinkable composition described above. Double-sided adhesive tapes are often carried on a release liner, fabric, foam, scrim, tissue, or polymeric material (e.g., polyethylene terephthalate).

Some particular adhesive articles include masking tape. Such articles advantageously can be cleanly removed from a variety of substrates such as painted substrates (e.g., automotive exterior painted surfaces and interior latex painted surfaces) and metal (treated or untreated) substrates (e.g., stainless steel). The adhesive articles can be cleanly removed after use without leaving any undesired residue from the adhesive behind on the substrate. The lack of tackifiers in the crosslinked compositions tends to enhance clean removability.

Other particular adhesive articles include a foam backing (i.e., the crosslinked composition is adjacent to a rough surface such as a foam substrate). The low molecular weight of both the first (meth)acrylate polymer and the second (meth)acrylate polymer tend to enhance adhesion of the crosslinked composition to the foam substrate.

The adhesive articles can be adhered to any suitable surface. In some embodiments, the adhesive articles are adhered to low surface energy surfaces.

In yet another aspect, a method of preparing an article is provided. The method includes providing a substrate, positioning a crosslinkable composition adjacent to the substrate, and then exposing the crosslinkable composition to ultraviolet light to form a crosslinked composition. The crosslinkable composition contains at least two different (meth)acrylate polymers and is free or substantially free of a tackifier. The (meth)acrylate polymers include a first (meth)acrylate polymer and a second (meth)acrylate polymer that each have a weight average molecular weight in a range of 50,000 to 500,000 Daltons. The first (meth)acrylate polymer is a reaction product of a first monomer composition comprising a) an alkyl (meth)acrylate and b) an optional UV crosslinking monomer having an aromatic ketone group that is crosslinkable when exposed to ultraviolet radiation. The optional UV crosslinking monomer in the first monomer composition is present in an amount in a range of 0 to 0.3 mole percent based on total moles of monomer in the first monomer composition. The second (meth)acrylate polymer is a reaction product of a second monomer composition that includes a) an alkyl (meth)acrylate and b) a UV crosslinking monomer having an aromatic ketone group that is crosslinkable when exposed to ultraviolet radiation. The UV crosslinking monomer in the second monomer composition is present in an amount equal to at least 1 mole percent based on total moles of monomer in the second monomer composition.

In many embodiments of this method, the crosslinkable composition is positioned adjacent to the substrate by extruding the crosslinkable composition in a molten state. The various components of the crosslinkable composition are mixed together as a hot melt prior to extrusion. That is, the substrate is coated with the hot melt blended crosslinkable composition that exits the extruder. The extruded coating of the crosslinkable composition can be crosslinked upon exposure to UV radiation. Such methods allow the separation of the coating process from the crosslinking reactions needed to provide the good cohesive strength and shear holding power.

The coating process can be performed using (meth) acrylate polymers that have little or no crosslinking. Such polymeric materials can easily flow under the typical hot melt processing conditions. Hot melt processing advantageously use no organic solvents or minimal organic solvents. Thus, such processing methods are environmentally desirable.

The crosslinking process (e.g., exposure of the coated crosslinkable composition to UV radiation) is continued until the amount of crosslinking is sufficient to provide at least some insoluble gel when the resulting crosslinked composition is analyzed according to the gel content test described in the in the Examples below. The percent insoluble gel is often at least 20 weight percent, at least 25 weight percent, at least 30 weight percent, at least 35 weight percent, or at least 40 weight percent of the crosslinked composition. The percent insoluble gel is often no greater than 95 weight percent, no greater than 90 weight percent, no greater than 85 weight percent, or no greater than 80 weight percent of the crosslinked composition.

The amount of crosslinking in the crosslinked composition can be varied by altering the relative amounts of the first (meth)acrylate polymer and the second (meth)acrylate polymer. Changing this relative amount can result in either an increase or decrease in the amount of UV crosslinkable groups in the crosslinkable composition. The extent of crosslinking can be more easily adjusted compared to a composition containing a single (meth)polymer having UV crosslinkable groups. In such as composition, altering the amount of crosslinking would typically necessitate the preparation of another (meth)polymer with a different amount of UV crosslinkable groups.

Various embodiments of crosslinkable compositions, crosslinked compositions, articles containing these compositions, and methods of making the articles are provided.

Embodiment 1A is a crosslinkable composition that includes a first (meth)acrylate polymer and a second (meth) acrylate polymer, wherein each of the first (meth)acrylate polymer and the second (meth)acrylate polymer have a weight average molecular weight in a range of 50,000 to 500,000 Daltons. The first (meth)acrylate polymer is a reaction product of a first monomer composition comprising a) an alkyl (meth)acrylate and b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition. The second (meth)acrylate polymer is a reaction product of a second monomer composition comprising a) an alkyl (meth)acrylate and b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition. The crosslinkable composition is free or substantially free of the tackifier.

Embodiment 2A is the crosslinkable composition of embodiment 1A, wherein the first (meth)acrylate polymer is present in an amount in a range of 80 to 98 weight percent and the second (meth)acrylate polymer is present in an amount in a range of 2 to 20 weight percent based on a total weight of (meth)acrylate polymers in the crosslinkable composition.

Embodiment 3A is the crosslinkable composition of embodiment 1A or 2A, wherein the UV crosslinking monomer is a benzophenone-based monomer.

Embodiment 4A is the crosslinkable composition of any one of embodiments 1A to 3A, wherein the first monomer composition further comprises a polar monomer, the second monomer composition further comprises a polar monomer, or both.

Embodiment 5A is the crosslinkable composition of any one of embodiments 1A to 4A, wherein the UV crosslinking monomer in the first monomer composition is present in an amount in a range of 0.01 to 0.3 mole percent based on total moles of monomer in the first monomer composition.

Embodiment 6A is the crosslinkable composition of any one of embodiments 1A to 5A, wherein the first reaction mixture further comprises a polar monomer having an acid group and the second monomer composition further comprises a polar monomer having a basic group or wherein the first reaction mixture further comprises a polar monomer having a basic group and the second monomer composition further comprises a polar monomer having an acidic group.

Embodiment 7A is the crosslinkable composition of any one of embodiments 1A to 6A, wherein the first (meth) acrylate polymer and the second (meth)acrylate polymer each have a weight average molecular weight in a range of 100,000 to 500,000 Daltons.

Embodiment 8A is the crosslinkable composition of any one of embodiments 1A to 7A, wherein the first (meth) acrylate polymer and the second (meth)acrylate polymer each have a Tg no greater than 20° C. as determined using Dynamic Mechanical Analysis.

Embodiment 9A is the crosslinkable composition of any one of embodiments 1A to 8A, wherein the first monomer composition contains 60 to 100 mole percent alkyl (meth) acrylate, 0 to 40 mole percent polar monomer, and 0 to 0.3 mole percent UV crosslinking monomer.

Embodiment 10A is the crosslinkable composition of embodiment 9A, wherein the first monomer composition contains 90 to 99 mole percent alkyl (meth)acrylate, 1 to 10 mole percent polar monomer, and 0 to 0.3 mole percent UV crosslinking monomer.

Embodiment 11A is the crosslinkable composition of embodiment 9A or 10A, wherein the polar monomer has an acidic group or a basic group. The polar monomer having a basic group is often a nitrogen-containing monomer.

Embodiment 12A is the crosslinkable composition of any one of embodiments 1A to 11A, wherein the second monomer composition contains 60 to 99 mole percent alkyl (meth)acrylate, 0 to 39 mole percent polar monomer, and 1 to 10 mole percent UV crosslinking monomer.

Embodiment 13A is the crosslinkable composition of embodiment 12A, wherein the second monomer composition contains 60 to 98 mole percent alkyl (meth)acrylate, 1 to 39 mole percent polar monomer, and 1 to 10 mole percent UV crosslinking monomer.

Embodiment 1B is an article that includes a substrate and a coating of a crosslinkable composition positioned adjacent to the substrate. The crosslinkable composition includes a first (meth)acrylate polymer and a second (meth)acrylate polymer, wherein each of the first (meth)acrylate polymer and the second (meth)acrylate polymer have a weight average molecular weight in a range of 50,000 to 500,000 Daltons. The first (meth)acrylate polymer is a reaction product of a first monomer composition comprising a) an alkyl (meth)acrylate and b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition. The second (meth)acrylate polymer is a reaction product of a second monomer composition comprising a) an alkyl (meth)acrylate and b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition. The crosslinkable composition is free or substantially free of the tackifier.

Embodiment 2B is the article of embodiment 1B, wherein the first (meth)acrylate polymer is present in an amount in a range of 80 to 98 weight percent and the second (meth) acrylate polymer is present in an amount in a range of 2 to 20 weight percent based on a total weight of (meth)acrylate polymers in the crosslinkable composition.

Embodiment 3B is the article of embodiment 1B or 2B, wherein the UV crosslinking monomer is a benzophenone-based monomer.

Embodiment 4B is the article of any one of embodiments 1B to 3B, wherein the first monomer composition further comprises a polar monomer, the second monomer composition further comprises a polar monomer, or both.

Embodiment 5B is the article of any one of embodiments 1B to 4B, wherein the UV crosslinking monomer in the first monomer composition is present in an amount in a range of 0.01 to 0.3 mole percent based on total moles of monomer in the first monomer composition.

Embodiment 6B is the article of any one of embodiments 1B to 5B, wherein the first reaction mixture further comprises a polar monomer having an acid group and the second monomer composition further comprises a polar monomer having a basic group or wherein the first reaction mixture further comprises a polar monomer having a basic group and the second monomer composition further comprises a polar monomer having an acidic group.

Embodiment 7B is the article of any one of embodiments 1B to 6B, wherein the first (meth)acrylate polymer and the second (meth)acrylate polymer each have a weight average molecular weight in a range of 100,000 to 500,000 Daltons.

Embodiment 8B is the article of any one of embodiments 1B to 7B, wherein the first (meth)acrylate polymer and the second (meth)acrylate polymer each have a Tg no greater than 20° C. as determined using Dynamic Mechanical Analysis.

Embodiment 9B is the article of any one of embodiments 1B to 8B, wherein the first monomer composition contains 60 to 100 mole percent alkyl (meth)acrylate, 0 to 40 mole percent polar monomer, and 0 to 0.3 mole percent UV crosslinking monomer.

Embodiment 10B is the article of embodiment 9B, wherein the first monomer composition contains 90 to 99 mole percent alkyl (meth)acrylate, 1 to 10 mole percent polar monomer, and 0 to 0.3 mole percent UV crosslinking monomer.

Embodiment 11B is the article of embodiment 9B or 10B, wherein the polar monomer has an acidic group or a basic group. The polar monomer having a basic group is often a nitrogen-containing monomer.

Embodiment 12B is the article of any one of embodiments 1B to 11B, wherein the second monomer composition contains 60 to 99 mole percent alkyl (meth)acrylate, 0 to 39 mole percent polar monomer, and 1 to 10 mole percent UV crosslinking monomer.

Embodiment 13B is the article of embodiment 12B, wherein the second monomer composition contains 60 to 98 mole percent alkyl (meth)acrylate, 1 to 39 mole percent polar monomer, and 1 to 10 mole percent UV crosslinking monomer.

Embodiment 1C is a crosslinked composition that contains a reaction product of a crosslinkable composition exposed to ultraviolet radiation. The crosslinkable composition is the same as described above. The crosslinkable composition includes a first (meth)acrylate polymer and a second (meth)acrylate polymer, wherein each of the first (meth)acrylate polymer and the second (meth)acrylate polymer have a weight average molecular weight in a range of 50,000 to 500,000 Daltons. The first (meth)acrylate polymer is a reaction product of a first monomer composition comprising a) an alkyl (meth)acrylate and b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition. The second (meth)acrylate polymer is a reaction product of a second monomer composition comprising a) an alkyl (meth)acrylate and b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition. The crosslinkable composition is free or substantially free of the tackifier.

Embodiment 2C is the crosslinked composition of embodiment 1C, wherein the first (meth)acrylate polymer is present in an amount in a range of 80 to 98 weight percent and the second (meth)acrylate polymer is present in an amount in a range of 2 to 20 weight percent based on a total weight of (meth)acrylate polymers in the crosslinkable composition.

Embodiment 3C is the crosslinked composition of embodiment 1C or 2C, wherein the UV crosslinking monomer is a benzophenone-based monomer.

Embodiment 4C is the crosslinked composition of any one of embodiments 1C to 3C, wherein the first monomer composition further comprises a polar monomer, the second monomer composition further comprises a polar monomer, or both.

Embodiment 5C is the crosslinked composition of any one of embodiments 1C to 4C, wherein the UV crosslinking monomer in the first monomer composition is present in an amount in a range of 0.01 to 0.3 mole percent based on total moles of monomer in the first monomer composition.

Embodiment 6C is the crosslinked composition of any one of embodiments 1C to 5C, wherein the first reaction mixture further comprises a polar monomer having an acid group and the second monomer composition further comprises a polar monomer having a basic group or wherein the first reaction mixture further comprises a polar monomer having a basic group and the second monomer composition further comprises a polar monomer having an acidic group.

Embodiment 7C is the crosslinked composition of any one of embodiments 1C to 6C, wherein the first (meth)acrylate polymer and the second (meth)acrylate polymer each have a weight average molecular weight in a range of 100,000 to 500,000 Daltons.

Embodiment 8C is the crosslinked composition of any one of embodiments 1C to 7C, wherein the first (meth)acrylate polymer and the second (meth)acrylate polymer each have a Tg no greater than 20° C. as determined using Dynamic Mechanical Analysis.

Embodiment 9C is the crosslinked composition of any one of embodiments 1C to 8C, wherein the first monomer composition contains 60 to 100 mole percent alkyl (meth)acrylate, 0 to 40 mole percent polar monomer, and 0 to 0.3 mole percent UV crosslinking monomer.

Embodiment 10C is the crosslinked composition of embodiment 9C, wherein the first monomer composition contains 90 to 99 mole percent alkyl (meth)acrylate, 1 to 10 mole percent polar monomer, and 0 to 0.3 mole percent UV crosslinking monomer.

Embodiment 11C is the crosslinked composition of embodiment 9C or 10C, wherein the polar monomer has an acidic group or a basic group. The polar monomer having a basic group is often a nitrogen-containing monomer.

Embodiment 12C is the crosslinked composition of any one of embodiments 1C to 11C, wherein the second monomer composition contains 60 to 99 mole percent alkyl (meth)acrylate, 0 to 39 mole percent polar monomer, and 1 to 10 mole percent UV crosslinking monomer.

Embodiment 13C is the crosslinked composition of embodiment 12C, wherein the second monomer composition contains 60 to 98 mole percent alkyl (meth)acrylate, 1 to 39 mole percent polar monomer, and 1 to 10 mole percent UV crosslinking monomer.

Embodiment 1D is an article that includes a substrate and a coating of a crosslinked composition positioned adjacent to the substrate. The crosslinked composition contains a reaction product of a crosslinkable composition exposed to ultraviolet radiation. The crosslinkable composition includes a first (meth)acrylate polymer and a second (meth)acrylate polymer, wherein each of the first (meth)acrylate polymer and the second (meth)acrylate polymer have a weight average molecular weight in a range of 50,000 to 500,000 Daltons. The first (meth)acrylate polymer is a reaction product of a first monomer composition comprising a) an alkyl (meth)acrylate and b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition. The second (meth)acrylate polymer is a reaction product of a second monomer composition comprising a) an alkyl (meth)acrylate and b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition. The crosslinkable composition is free or substantially free of the tackifier.

Embodiment 2D is the article of embodiment 1D, wherein the first (meth)acrylate polymer is present in an amount in a range of 80 to 98 weight percent and the second (meth)acrylate polymer is present in an amount in a range of 2 to 20 weight percent based on a total weight of (meth)acrylate polymers in the crosslinkable composition.

Embodiment 3D is the article of embodiment 1D or 2D, wherein the UV crosslinking monomer is a benzophenone-based monomer.

Embodiment 4D is the article of any one of embodiments 1D to 3D, wherein the first monomer composition further comprises a polar monomer, the second monomer composition further comprises a polar monomer, or both.

Embodiment 5D is the article of any one of embodiments 1D to 4D, wherein the UV crosslinking monomer in the first monomer composition is present in an amount in a range of 0.01 to 0.3 mole percent based on total moles of monomer in the first monomer composition.

Embodiment 6D is the article of any one of embodiments 1D to 5D, wherein the first reaction mixture further comprises a polar monomer having an acid group and the second monomer composition further comprises a polar monomer having a basic group or wherein the first reaction mixture further comprises a polar monomer having a basic group and the second monomer composition further comprises a polar monomer having an acidic group.

Embodiment 7D is the article of any one of embodiments 1D to 6D, wherein the first (meth)acrylate polymer and the second (meth)acrylate polymer each have a weight average molecular weight in a range of 100,000 to 500,000 Daltons.

Embodiment 8D is the article of any one of embodiments 1D to 7D, wherein the first (meth)acrylate polymer and the second (meth)acrylate polymer each have a Tg no greater than 20° C. as determined using Dynamic Mechanical Analysis.

Embodiment 9D is the article of any one of embodiments 1D to 8D, wherein the first monomer composition contains 60 to 100 mole percent alkyl (meth)acrylate, 0 to 40 mole percent polar monomer, and 0 to 0.3 mole percent UV crosslinking monomer.

Embodiment 10D is the article of embodiment 9D, wherein the first monomer composition contains 90 to 99 mole percent alkyl (meth)acrylate, 1 to 10 mole percent polar monomer, and 0 to 0.3 mole percent UV crosslinking monomer.

Embodiment 11D is the article of embodiment 9D or 10D, wherein the polar monomer has an acidic group or a basic group. The polar monomer having a basic group is often a nitrogen-containing monomer.

Embodiment 12D is the article of any one of embodiments 1D to 11D, wherein the second monomer composition contains 60 to 99 mole percent alkyl (meth)acrylate, 0 to 39 mole percent polar monomer, and 1 to 10 mole percent UV crosslinking monomer.

Embodiment 13D is the article of embodiment 12D, wherein the second monomer composition contains 60 to 98 mole percent alkyl (meth)acrylate, 1 to 39 mole percent polar monomer, and 1 to 10 mole percent UV crosslinking monomer.

Embodiment 1E is a method of making an article. The method includes providing a substrate, positioning a crosslinkable composition adjacent to the substrate, and then exposing the crosslinkable composition to ultraviolet light to form a crosslinked composition. The crosslinkable composition includes a first (meth)acrylate polymer and a second (meth)acrylate polymer, wherein each of the first (meth) acrylate polymer and the second (meth)acrylate polymer have a weight average molecular weight in a range of 50,000 to 500,000 Daltons. The first (meth)acrylate polymer is a reaction product of a first monomer composition comprising a) an alkyl (meth)acrylate and b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition. The second (meth)acrylate polymer is a reaction product of a second monomer composition comprising a) an alkyl (meth)acrylate and b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition. The crosslinkable composition is free or substantially free of the tackifier.

Embodiment 2E is the method of embodiment 1E, wherein the first (meth)acrylate polymer is present in an amount in a range of 80 to 98 weight percent and the second (meth)acrylate polymer is present in an amount in a range of 2 to 20 weight percent based on a total weight of (meth) acrylate polymers in the crosslinkable composition.

Embodiment 3E is the method of embodiment 1E or 2E, wherein the UV crosslinking monomer is a benzophenone-based monomer.

Embodiment 4E is the method of any one of embodiments 1E to 3E, wherein the first monomer composition further comprises a polar monomer, the second monomer composition further comprises a polar monomer, or both.

Embodiment 5E is the method of any one of embodiments 1E to 4E, wherein the UV crosslinking monomer in the first monomer composition is present in an amount in a range of 0.01 to 0.3 mole percent based on total moles of monomer in the first monomer composition.

Embodiment 6E is the method of any one of embodiments 1E to 5E, wherein the first reaction mixture further comprises a polar monomer having an acid group and the second monomer composition further comprises a polar monomer having a basic group or wherein the first reaction mixture further comprises a polar monomer having a basic group and the second monomer composition further comprises a polar monomer having an acidic group.

Embodiment 7E is the method of any one of embodiments 1E to 6E, wherein the first (meth)acrylate polymer and the second (meth)acrylate polymer each have a weight average molecular weight in a range of 100,000 to 500,000 Daltons.

Embodiment 8E is the method of any one of embodiments 1E to 7E, wherein the first (meth)acrylate polymer and the second (meth)acrylate polymer each have a Tg no greater than 20° C. as determined using Dynamic Mechanical Analysis.

Embodiment 9E is the method of any one of embodiments 1E to 8E, wherein the first monomer composition contains 60 to 100 mole percent alkyl (meth)acrylate, 0 to 40 mole percent polar monomer, and 0 to 0.3 mole percent UV crosslinking monomer.

Embodiment 10E is the method of embodiment 9E, wherein the first monomer composition contains 90 to 99 mole percent alkyl (meth)acrylate, 1 to 10 mole percent polar monomer, and 0 to 0.3 mole percent UV crosslinking monomer.

Embodiment 11E is the method of embodiment 9E or 10E, wherein the polar monomer has an acidic group or a basic group. The polar monomer having a basic group is often a nitrogen-containing monomer.

Embodiment 12E is the method of any one of embodiments 1E to 11E, wherein the second monomer composition contains 60 to 99 mole percent alkyl (meth)acrylate, 0 to 39 mole percent polar monomer, and 1 to 10 mole percent UV crosslinking monomer.

Embodiment 13E is the method of embodiment 12E, wherein the second monomer composition contains 60 to 98 mole percent alkyl (meth)acrylate, 1 to 39 mole percent polar monomer, and 1 to 10 mole percent UV crosslinking monomer.

EXAMPLES

Methods

Rolling Ball Tack:

The working surface is positioned and adjusted to be perfectly horizontal. Prior to each roll of the ball, the 5.6 gram standard metal ball is thoroughly cleaned using a heptane bath and wiped dry with a lint-free, bleached, absorbent material to remove any remaining solvent residue.

The specimen to be tested is placed, adhesive side up, on the working surface. The specimen is positioned so that at least 12 inches (300 mm) of tape is exposed after the incline ramp is placed over the specimen. The end of the specimen opposite the incline ramp is held to the working surface with tape. Using clean dry tongs, the 5.6 gram ball is placed on the upper side of the release pin at the top of the incline ramp. The vertical distance from the center of the ball to the working surface is 2.75 inches (70 mm). The ball is released to slide down the incline ramp by pressing down on the release pin and the ball is allowed to roll to a stop on the adhesive surface. The distance from where the ball initially contacts the adhesive to the point where the ball stops is measured.

The stopping distance measurements are reported in millimeters. When more than one test was performed on a particular tape sample, the distance measurements were averaged. The 5.6 gram ball was cleaned and a fresh strip of tape was used to begin each test.

Hot/Cold Peel Testing:

A 12.7 mm width by 150-200 mm length (0.5 inch width by 6-8 inch length) strip of tape was cut from a 150 mm wide tape sample with a 50 micrometer (2 mil) nominal adhesive coating thickness. The tape sample was then applied to a 100 mm wide (4" wide) painted metal test panel available from Advanced Coatings Technologies, Inc. (Hillsdale, Mich., USA), which has a base coat/clear coat automotive paint finish sold by BASF, with a 2 kg (4.5 pounds) hard rubber roller two times. Alternatively, samples were applied to a stainless steel test panel (Lot K 3M 10/10) from ChemInstruments (Fairfield, Ohio, USA).

Four to eight different tape samples were aligned in parallel with 2-4 mm of space between samples. The free end of all the adhesive tapes were adhered to a single wooden tongue depressor perpendicular to the samples such that all samples could be peeled in unison with a uniform speed. The first 50 mm of tape was peeled at an angle of 130°-140° by hand inside the oven at 93.3° C. (200° F.) after 30 minutes of aging at an approximate peel rate of 250-300 cm/min (100-120 inch/min). The test panel was then removed from the oven and allowed to cool on a slate benchtop for 5 minutes in ambient conditions. The remaining 50 mm of tape was then peeled near ambient conditions at an angle of 130°-140° by hand at an approximate peel rate of 250-300 cm/min (100-120 inch/min). The test panel was then evaluated for residual adhesive. No visual adhesive remaining is rated as clean removal and any adhesive residue is rated as dirty.

Molecular Weight Distribution:

Polymers were evaluated for their molecular weights and polydispersity index (PDI) using gel permeation chromatography (GPC). The polymer was dissolved in tetrahydrofuran at a concentration of 0.5 percent (weight of polymer/volume of solvent) and passed through a 0.2 micrometer polytetrafluoroethylene filter. Samples of the resulting solution were analyzed using a Waters Corporation (Milford, Mass., USA) GPC unit equipped with two PLgel 5 micrometer MIXED-D columns (Styragel HRSE 7.8 mm×300 mm) at 35° C. (obtained from Waters Corp., Milford, Mass., USA) and UV (Model 2487) and Refractive Index (Model 2410) detectors. After injection samples were eluted at 1 milliliter/minute. Calibration was carried out using polystyrene standards. The weight average molecular weight (Mw) was determined and reported in kiloDaltons (kDa).

Shear Storage Modulus and Glass Transition Temperature (Tg)

The modulus and glass transition temperature (Tg) of adhesive film samples were determined using a rheological dynamic mechanical analyzer (Model DHR-3 Rheometer, which is available from TA Instruments, New Castle, Del., USA) in a parallel plate mode. Samples were prepared by coating the solvated adhesive onto a silicone release liner and drying at 70° C. in a forced air oven. The resulting film was then layered up to a thickness of approximately 1 millimeter (0.039 inches). Rheology samples were then punched out using an 8 millimeter (0.315 inches) diameter circular die, and centered between two parallel plates, each having a diameter of 8 millimeters, after removal of the release liner. The plates with adhesive were positioned in the rheometer and compressed until the edges of the adhesive film were uniform with the edges of the top and bottom plates. The temperature was then ramped in two stages, first from 40° C. to −60° C. at 3° C./minute while the parallel plates were oscillated at an angular frequency of 1 radian per second with a constant strain of 1% until the applied stress exceeded 3,500 Pa, at which time the testing mode was switched to a constant applied stress of 3,500 Pa and continued ramping down in temperature at 3° C./minute. The second stage equilibrated the sample back to 30° C., then ramped from 30° C. towards a maximum temperature of 150° C. at 3° C./minute with a constant strain of 5 percent while the parallel plates were oscillated at an angular frequency of 1 radian per second. However, data collection was stopped once the shear storage moduli (G') dropped below 100 Pa. The shear storage moduli (G') and shear loss moduli (G") were measured and used to calculate tan delta (G"/G') as a function of temperature. The peak of the tan delta curve was taken as the glass transition temperature.

TABLE 1

Materials

| Acronym | Description |
| --- | --- |
| 2-EHA | 2-ethylhexyl acrylate, a monomer from Aldrich, St, Louis, MO, USA |
| Acm | Acrylamide, a monomer from Zibo Xinye Chemical Co., Shandong, China |
| tDDM | Tertiary dodecyl mercaptan, a chain transfer agent from Aldrich, St., Louis, MO, USA |
| VAZ0 67 | (2,2'-azo-bis(2-methylbutanenitrile)), a thermally activated polymerization initiator from DuPont, Wilmington, DE, USA |
| IOTG | Iso-octyl thioglycolate, a chain transfer agent from Evans Chemetics, Teaneck, NJ, USA |
| AeBP | Acryloylethoxy benzophenone, a polymerizable monomer containing a separately photoreactive group that was prepared using a method similar to that described in U.S. Pat. No. 7,838,110 B2 (Zhu et al.) |
| Ethyl acetate | Solvent from Aldrich, St., Louis, MO, USA |
| Acrylic acid | Polar monomer from Alfa Aesar, Heysham, England |

Polymers P1-P16: Preparation of Solvent Based Samples

For Polymer 1, 95.0 grams of 2-EHA, 5.0 grams of AA, 1.0 grams of a 20 weight percent solution of VAZO 67 in EtAc, 0.48 grams of a 5 weight percent solution of IOTG in EtAc, and 98.5 grams of EtAc were added to a 1 liter glass amber bottle. The contents were mixed and bubbled with nitrogen for 4 minutes before being sealed and placed in a Laundrometer rotating water bath (SDL Atlas, Rock Hill, S.C., USA) for 24 hours at 65° C. After 24 hours, the sample was removed from the Laundrometer and cooled using ambient conditions. The sample was analyzed using GPC to determine that the Mw was 465 kDa.

Polymers P2-P16 were prepared in a similar manner to polymer P1 except with the modifications shown in Table 2 below. Table 2 summarizes the composition used to form the (meth)acrylate polymers. The amounts of the monomers are in weight percent based on the total weight of monomers. The amount of solvent (EtAc), the amount of VAZO 67, the amount of IOTG, and the amount of TDDM are pph (parts per hundred−amount added based on 100 grams of (meth)acrylate polymer). Table 3 summarizes characterization information about polymers P1-P16.

TABLE 2

Preparation of Polymer Solutions P1-P16

| Polymer Solution | 2-EHA (wt %) | AA (wt %) | Acm (wt %) | AeBP (wt %) | VAZO 67 (pph) | EtAc (pph) | IOTG (pph) | tDDM (pph) |
|---|---|---|---|---|---|---|---|---|
| P1 | 95 | 5 | 0 | 0 | 0.2 | 100 | 0.024 | 0 |
| P2 | 95 | 5 | 0 | 0 | 0.2 | 100 | 0.035 | 0 |
| P3 | 95 | 5 | 0 | 0 | 0.2 | 100 | 0.050 | 0 |
| P4 | 95 | 5 | 0 | 0 | 0.2 | 100 | 0.070 | 0 |
| P5 | 95 | 5 | 0 | 0 | 0.2 | 100 | 0.110 | 0 |
| P6 | 95 | 5 | 0 | 0 | 0.2 | 100 | 0.250 | 0 |
| P7 | 90 | 0 | 5 | 5 | 0.2 | 100 | 0 | 0.055 |
| P8 | 90 | 0 | 5 | 5 | 0.2 | 100 | 0 | 0.070 |
| P9 | 90 | 0 | 5 | 5 | 0.2 | 100 | 0 | 0.130 |
| P10 | 90 | 0 | 5 | 5 | 0.2 | 100 | 0 | 0.200 |
| P11 | 90 | 0 | 5 | 5 | 0.2 | 100 | 0 | 0.300 |
| P12 | 98 | 2 | 0 | 0 | 0.2 | 100 | 0.050 | 0 |
| P13 | 98 | 2 | 0 | 0 | 0.2 | 100 | 0.110 | 0 |
| P14 | 95 | 5 | 0 | 0 | 0.2 | 100 | 0.014 | 0 |
| P15 | 95 | 5 | 0 | 0 | 0.2 | 100 | 0.011 | 0 |
| P16 | 98 | 2 | 0 | 0 | 0.2 | 100 | 0.014 | 0 |

TABLE 3

Characterization of P1 to P16

| Polymer Solution | Mw (kDa) | PDI | Tg (° C.) |
|---|---|---|---|
| P1 | 465 | 6.9 | |
| P2 | 415 | 5.8 | |
| P3 | 319 | 5.0 | −41 |
| P4 | 275 | 5.0 | |
| P5 | 216 | 3.5 | |
| P6 | 109 | 3.0 | |
| P7 | 544 | 6.6 | |
| P8 | 440 | 5.4 | |
| P9 | 260 | 4.3 | −20 |
| P10 | 182 | 3.6 | |
| P11 | 126 | 3.1 | |
| P12 | 317 | 5.5 | −50 |
| P13 | 276 | 5.1 | |
| P14 | 662 | 6.6 | |
| P15 | 799 | 8.3 | |
| P16 | 649 | 7.0 | |

Examples 1-12 and Comparative Examples CE1-CE4: Preparation of Tape Samples

After polymerization, all polymer solutions were evaluated by visual inspection to determine if their viscosities were acceptable for knife coating. P7 and several other higher molecular weight solutions were identified as being too viscous and were further diluted with EtAc to achieve the percent solids reported in Table 3. Thus, P7 was reduced from 50 percent solids to 40 percent solids by the addition of 50 grams EtAc to the glass bottle mixed on a reciprocal shaker for 24 hours.

Comparative Example 1 (CE1) is composed of a blend of 30 grams P2 solution, 2.33 grams P10 solution, and 3.75 grams KH-85 rosin ester tackifier added to a 4 ounce amber jar and mixed on a jar roller overnight. The solution was then knife coated through a 7 mil gap onto a low adhesion backside crepe paper (the crepe paper was made from a 26 pounds/ream (42.5 grams/m$^2$) paper sheet saturated using a styrene-butadiene rubber latex solution to produce a final saturated crepe paper 0.0037 inches (0.094 millimeters) thick with 20 pounds/inch of tensile strength at break and 8 percent elongation at break when measured in the direction perpendicular to the crepe pattern) and dried at 70° C. for at least 20 minutes to yield a 2 mil thick dry adhesive tape. The adhesive was then cured open-faced with 20 mJ UVC radiation with an H-bulb on a Fusion processor system. Examples 1-12 and Comparative Example CE2-CE4 were prepared in a manner similar to Comparative Example 1 except with the modifications shown in Table 4 below. Characterization of Examples 1-12 and Comparative Examples CE1 to CE4 are in Table 5.

TABLE 4

Examples 1-12 and Comparative Examples CE1-CE4: Polymer Blends

| Ex. # | First Polymer Solution | First Polymer Solution (wt. % Solids) | First Polymer Solution (grams) | Second Polymer Solution | Second Polymer Solution (wt. % Solids) | Second Polymer Solution (grams) | KH-85 Tackifier (grams) |
|---|---|---|---|---|---|---|---|
| CE 1 | P2 | 50% | 30.0 | P9 | 45% | 2.33 | 3.75 |
| CE 2 | P5 | 50% | 30.0 | P9 | 45% | 2.33 | 3.75 |
| CE 3 | P14 | 40% | 37.5 | P7 | 40% | 2.63 | 0 |
| CE 4 | P15 | 40% | 37.5 | P7 | 40% | 2.63 | 0 |
| Ex 1 | P2 | 50% | 30.0 | P9 | 45% | 2.33 | 0 |
| Ex 2 | P3 | 50% | 30.0 | P9 | 45% | 2.33 | 0 |
| Ex 3 | P5 | 50% | 30.0 | P9 | 45% | 2.33 | 0 |
| Ex 4 | P6 | 50% | 30.0 | P9 | 45% | 2.33 | 0 |
| Ex 5 | P4 | 50% | 30.0 | P8 | 40% | 2.63 | 0 |
| Ex 6 | P4 | 50% | 30.0 | P10 | 50% | 2.10 | 0 |
| Ex 7 | P13 | 50% | 30.0 | P8 | 40% | 2.63 | 0 |
| Ex 8 | P13 | 50% | 30.0 | P10 | 50% | 2.10 | 0 |

TABLE 4-continued

Examples 1-12 and Comparative Examples CE1-CE4: Polymer Blends

| Ex. # | First Polymer Solution | First Polymer Solution (wt. % Solids) | First Polymer Solution (grams) | Second Polymer Solution | Second Polymer Solution (wt. % Solids) | Second Polymer Solution (grams) | KH-85 Tackifier (grams) |
|---|---|---|---|---|---|---|---|
| Ex 9  | P3 | 50% | 30.0 | P9  | 45% | 1.67 | 0 |
| Ex 10 | P3 | 50% | 30.0 | P9  | 45% | 3.00 | 0 |
| Ex 11 | P2 | 50% | 30.0 | P8  | 40% | 2.63 | 0 |
| Ex 12 | P6 | 50% | 30.0 | P11 | 50% | 2.10 | 0 |

TABLE 5

Characterization of CE1-CE-4 and Ex 1-Ex 12

| Ex. # | 200° F. Hot/Cold Removal from Stainless Steel Panel | 200° F. Hot/Cold Removal from Automotive Paint Panel | Rolling Ball (5.6 grams) Tack (mm) |
|---|---|---|---|
| CE1  | Dirty/Dirty | Clean/Clean | 21.5 |
| CE2  | Dirty/Dirty | Clean/Clean | 26 |
| CE3  | NT | Clean/Clean | 77.75 |
| CE4  | NT | Clean/Clean | 74 |
| Ex1  | Clean/Clean | Clean/Clean | 26 |
| Ex2  | NT | Clean/Clean | 32 |
| Ex3  | Clean/Clean | Clean/Clean | 20 |
| Ex4  | NT | Clean/Clean | 28 |
| Ex5  | NT | Clean/Clean | 30 |
| Ex6  | NT | Clean/Clean | 32 |
| Ex7  | NT | Clean/Clean | 10 |
| Ex8  | NT | Clean/Clean | 11 |
| Ex9  | NT | Clean/Clean | 22 |
| Ex10 | NT | Clean/Clean | 28 |
| Ex11 | NT | Clean/Clean | 30 |
| Ex12 | NT | Clean/Clean | 31 |

We claim:

1. A crosslinkable composition comprising:
   1) a first (meth)acrylate polymer having a weight average molecular weight in a range of 50,000 to 500,000 Daltons, wherein the first (meth)acrylate polymer is a reaction product of a first monomer composition comprising
      a) an alkyl (meth)acrylate; and
      b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition; and
   2) a second (meth)acrylate polymer having a weight average molecular weight in a range of 50,000 to 500,000 Daltons, wherein the second (meth)acrylate polymer is a reaction product of a second monomer composition comprising
      a) an alkyl (meth)acrylate; and
      b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition,
   wherein the crosslinkable composition is free or substantially free of tackifier.

2. The crosslinkable composition of claim 1, wherein the first (meth)acrylate polymer is present in an amount in a range of 80 to 98 weight percent and the second (meth)acrylate polymer is present in an amount in a range of 2 to 20 weight percent based on a total weight of (meth)acrylate polymers in the crosslinkable composition.

3. The crosslinkable composition of claim 1, wherein the UV crosslinking monomer is a benzophenone-based monomer.

4. The crosslinkable composition of claim 1, wherein the first monomer composition further comprises a polar monomer, the second monomer composition further comprises a polar monomer, or both.

5. The crosslinkable composition of claim 1, wherein the UV crosslinking monomer in the first monomer composition is present in an amount in a range of 0.01 to 0.3 mole percent based on total moles of monomer in the first monomer composition.

6. The crosslinkable composition of claim 1, wherein the first monomer composition further comprises a polar monomer having an acid group and the second monomer composition further comprises a polar monomer having a basic group or wherein the first monomer composition further comprises a polar monomer having a basic group and the second monomer composition further comprises a polar monomer having an acidic group.

7. The crosslinkable composition of claim 1, wherein the first (meth)acrylate polymer and the second (meth)acrylate polymer each have a weight average molecular weight in a range of 100,000 to 500,000 Daltons.

8. An article comprising:
   a substrate; and
   a coating of a crosslinkable composition positioned adjacent to the substrate, the crosslinkable composition comprising
   1) a first (meth)acrylate polymer having a weight average molecular weight in a range of 50,000 to 500,000 Daltons, wherein the first (meth)acrylate polymer is a reaction product of a first monomer composition comprising
      a) an alkyl (meth)acrylate; and
      b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition; and
   2) a second (meth)acrylate polymer having a weight average molecular weight in a range of 50,000 to 500,000 Daltons, wherein the second (meth)acrylate polymer is a reaction product of a second monomer composition comprising
      a) an alkyl (meth)acrylate; and
      b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition, wherein the crosslinkable composition is free or substantially free of tackifier.

9. The article of claim 8, wherein the first (meth)acrylate polymer is present in an amount in a range of 80 to 98 weight percent and the second (meth)acrylate polymer is present in an amount in a range of 2 to 20 weight percent based on a total weight of (meth)acrylate polymers in the crosslinkable composition.

10. A crosslinked composition comprising a reaction product of a crosslinkable composition exposed to ultraviolet radiation, the crosslinkable composition comprising:
1) a first (meth)acrylate polymer having a weight average molecular weight in a range of 50,000 to 500,000 Daltons, wherein the first (meth)acrylate polymer is a reaction product of a first monomer composition comprising
   a) an alkyl (meth)acrylate; and
   b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition; and
2) a second (meth)acrylate polymer having a weight average molecular weight in a range of 50,000 to 500,000 Daltons, wherein the second (meth)acrylate polymer is a reaction product of a second monomer composition comprising
   a) an alkyl (meth)acrylate; and
   b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition, wherein the crosslinkable composition is free or substantially free of tackifier.

11. The crosslinked composition of claim 10, wherein the first (meth)acrylate polymer is present in an amount in a range of 80 to 98 weight percent and the second (meth)acrylate polymer is present in an amount in a range of 2 to 20 weight percent based on a total weight of (meth)acrylate polymers in the crosslinkable composition.

12. The crosslinked composition of claim 10, wherein the first monomer composition further comprises a polar monomer having an acid group and the second monomer composition further comprises a polar monomer having a basic group or wherein the first monomer composition further comprises a polar monomer having a basic group and the second monomer composition further comprises a polar monomer having an acidic group.

13. An article comprising:

a substrate; and a coating of a crosslinked composition positioned adjacent to the substrate, the crosslinked composition comprising a reaction product of a crosslinkable composition exposed to ultraviolet radiation, the crosslinkable composition comprising:
1) a first (meth)acrylate polymer having a weight average molecular weight in a range of 50,000 to 500,000 Daltons, wherein the first (meth)acrylate polymer is a reaction product of a first monomer composition comprising
   a) an alkyl (meth)acrylate; and
   b) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer composition; and
2) a second (meth)acrylate polymer having a weight average molecular weight in a range of 50,000 to 500,000 Daltons, wherein the second (meth)acrylate polymer is a reaction product of a second monomer composition comprising
   a) an alkyl (meth)acrylate; and
   b) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer composition, wherein the crosslinkable composition is free or substantially free of tackifier.

14. The article of claim 13, wherein the first (meth)acrylate polymer is present in an amount in a range of 80 to 98 weight percent and the second (meth)acrylate polymer is present in an amount in a range of 2 to 20 weight percent based on a total weight of (meth)acrylate polymers in the crosslinkable composition.

* * * * *